Patented May 3, 1932

1,856,601

UNITED STATES PATENT OFFICE

EDMOND T. TISZA, OF NEW YORK, AND BERNARD JOOS, OF YONKERS, NEW YORK, ASSIGNORS TO THE PYRIDIUM CORPORATION, OF NEPERA PARK, NEW YORK, A CORPORATION OF NEW YORK

METHOD OF REPLACING ONE AMINO GROUP IN PHENYL-AZO-ALPHA-ALPHA-DIAMINO PYRIDINE WITH A HYDROXYL GROUP

No Drawing.   Application filed July 11, 1929.   Serial No. 377,600.

This invention is an improvement in methods of preparing beta-phenyl-azo-alpha-hydroxy-alpha-amino-pyridines.

The object of the invention is the provision of a simple and inexpensive method of replacing with a hydroxyl group, one amino group in alpha-alpha-diamino-pyridines, thereby to obtain beta-phenyl-azo-alpha-hydroxy-alpha-amino-pyridine.

When beta-phenyl-azo-alpha-alpha-diamino-pyridine is boiled with dilute hydrochloric acid for fifty minutes one amino group will be replaced with a hydroxyl group. The new substance an azo dye, like the original, can be used for medicinal purposes. It has distinct bactericidal properties in vitro. When administered orally to animals, it is eliminated through the urinary tract and sterilizes the urine to a certain extent.

This new method of obtaining beta-phenyl-azo-alpha-hydroxy-alpha-amino-pyridine directly out of beta-phenyl-azo-alpha-alpha-diamino-pyridine is a very important improvement.

The method of procedure is the following:

Example I 1.0 gram beta-phenyl-azo-alpha-alpha-diamino-pyridine hydrochloride is dissolved in 110 cc. of dilute hydrochloric acid of 2.5% and boiled on a reflux condenser for fifty minutes. No change of color or precipitation was noted in the liquid. After fifty minutes boiling, the mixture was cooled down, when a yellow precipitate formed. This precipitate was collected on a filter and washed with distilled water. The mother liquor gives off ammonia on addition of sodium hydroxide. To purify the precipitate, it was dissolved in 5 cc. sodium hydroxide of 40% at about 65° C., then cooled and precipitated with addition of hydrochloric acid till neutral reaction. The precipitate was then recrystallized out of acetone. The yield is about 60%.

Example II 0.86 gram beta-phenyl-azo-alpha-alpha-diaminopyridine was dissolved in 110 cc. of dilute sulphuric acid of 3.5% and boiled on a reflux condenser for one hour. No change of color or precipitation was noted in the liquid. After boiling for one hour, the mixture was cooled down, when a yellow precipitate formed. This precipitate was collected on a filter and washed with distilled water. To purify the precipitate, it was dissolved in 5 cc. sodium hydroxide of 40% at about 65° C., then cooled and precipitated with addition of sulphuric acid till neutral reaction. The precipitate was then recrystallized out of acetone.

The substance so obtained crystallizes out of acetone in yellow colored needles. It melts at 242° C. with decomposition. It is very slightly soluble in water and ether. Slightly soluble in chloroform, carbon tetrachloride, or toluol. More soluble in methyl alcohol and acetone. It is soluble with orange red color in dilute acids or alkalies forming the corresponding acid or alkali salts. The chemical reaction of the process is the following:

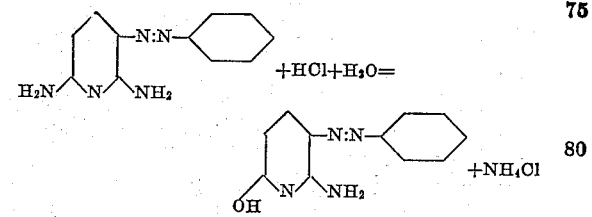

Of course, there is a possibility that two isomers of this substance are formed with the following formulas:—

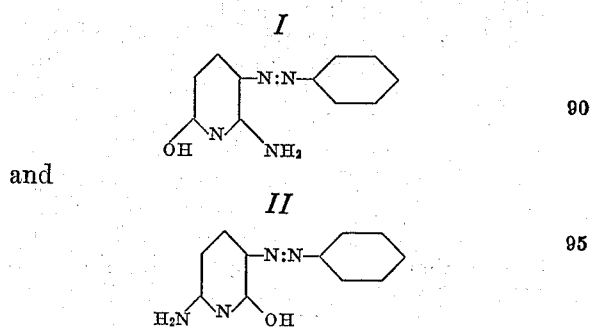

Preparing this substance by different methods, so far gave us always the same product.

To prove that the reaction product is actually as described above, we made combustions of the pure material:

The new substance gave the following result in combustion.

|  | Per cent |
|---|---|
| Carbon | 61.70 |
| Hydrogen | 4.80 |
| Nitrogen | 26.07 |
| Oxygen | 7.43 |

Calculated theoretically for beta-azo-alpha-hydroxy-alpha-amino-pyridine.

|  | Per cent |
|---|---|
| Carbon | 61.65 |
| Hydrogen | 4.71 |
| Nitrogen | 26.17 |
| Oxygen | 7.47 |

We also made a copulation between alpha-hydroxy-alpha-amino-pyridine and benzol diazonium chloride. This copulation was made in acid, alkali and neutral media. The resulting dye in each case has the same properties as the product obtained by this new method of replacing an amino group with hydroxyl group in beta-phenyl-azo-alpha-alpha-diamino-pyridine.

These facts verify the correctness of our new process of replacing one amino group in beta-phenyl-azo-alpha-alpha-diamino-pyridine with a hydroxyl group.

The reaction can be done with other mineral acids (sulphuric, etc.) instead of hydrochloric acid, and substituted phenyl-azo-alpha-alpha-diamino-pyridines may be used instead of beta-phenyl-azo-alpha-alpha-diamino-pyridine.

In order to obtain acid or alkali salts, it is only necessary to dissolve the base in the acid or alkali corresponding to the desired salt. As for instance, to obtain the hydrochloride, the base is dissolved in hydrochloric acid, or to obtain the soda salt, the base is dissolved in sodium hydroxide solution. These salts can be crystallized out of the respective solutions.

What is claimed as new is:

1. The method of preparing beta-phenyl-azo-alpha-hydroxy-alpha-amino-pyridine, which consists in boiling beta-phenyl-azo-alpha-alpha-diamino-pyridines with a dilute highly ionized mineral acid.

2. The method of preparing beta-phenyl-azo-alpha-hydroxy-alpha-amino-pyridine, which consists in boiling beta-phenyl-azo-alpha-alpha-diamino-pyridine with dilute (2.5% by weight) hydrochloric acid.

3. The method of preparing beta-phenyl-azo-alpha-hydroxy-alpha-amino-pyridine, which consists in replacing one amino group in beta-phenyl-azo-alpha-alpha-diamino-pyridines with a hydroxy group by boiling with a dilute mineral acid.

4. The method of preparing beta-phenyl-azo-alpha-hydroxy-alpha-amino-pyridine, which consists in replacing one amino group in beta-phenyl-azo-alpha-alpha-diamino-pyridine with a hydroxy group by boiling with dilute (2.5% by weight) hydrochloric acid.

5. In the method of preparing alkali soluble beta-phenyl-azo-alpha-hydroxy-alpha-amino-pyridine from beta-phenyl-azo-alpha-alpha-diamino-pyridine, the step which consists in boiling the beta-phenyl-azo-alpha-alpha-diamino-pyridine with dilute (2.5% by weight) hydrochloric acid.

6. In the method of preparing alkali soluble beta-phenyl-azo-alpha-hydroxy-alpha-amino-pyridines from beta-phenyl-azo-alpha-alpha-diamino-pyridine, the step which consists in boiling the beta-phenyl-azo-alpha-alpha-diamino-pyridine with a highly ionized dilute mineral acid.

7. In the method of preparing alkali soluble beta-phenyl-azo-alpha-hydroxy-alpha-amino-pyridine from beta-phenyl-azo-alpha-alpha-diamino pyridine, the step which consists in boiling the beta-phenyl-azo-alpha-alpha-diamino-pyridine with dilute hydrochloric acid.

8. In the method of preparing alkali soluble beta-phenyl-azo-alpha-hydroxy-alpha-amino-pyridine from beta-phenyl-azo-alpha-alpha-diamino-pyridine, the step which consists in boiling the beta-phenyl-azo-alpha-alpha-diamino-pyridine with dilute (2.5% by weight) hydrochloric acid.

9. In the method of preparing alkali soluble beta-phenyl-azo-alpha-hydroxy-alpha-amino-pyridines from beta-phenyl-azo-alpha-alpha-diamino-pyridines, the step which consists in boiling the beta-phenyl-azo-alpha-alpha-diamino-pyridine with a highly ionized dilute mineral acid.

10. A medicinal substance soluble in the acid fluids of the stomach and the alkaline fluids of the intestines, including an isomer of beta-phenyl-azo-alpha-hydroxy-alpha-amino-pyridine.

11. A medicinal substance soluble in the acid fluids of the stomach and the alkaline fluids of the intestines, including isomers of beta-phenyl-azo-alpha-hydroxy-alpha-amino-pyridine.

12. A medicinal substance soluble in the acid fluids of the stomach and the alkaline fluids of the intestines, composed of isomers of beta-phenyl-azo-alpha-hydroxy-alpha-amino-pyridine hydrochloride.

13. As a medicinal agent, the alkali salt of beta-phenyl-azo-alpha-hydroxy-alpha-amino-pyridine.

Signed at Yonkers, in the county of Westchester and State of New York, this 9th day of July, A. D. 1929.

Dr. BERNARD JOOS.
EDMOND T. TISZA.